(12) United States Patent
Thadani et al.

(10) Patent No.: US 6,600,110 B1
(45) Date of Patent: Jul. 29, 2003

(54) PORTABLE DIGITAL READOUT SCALE

(75) Inventors: Mohan Thadani, Mississauga (CA); Peter Klein, Langley (CA)

(73) Assignee: Gram Precision, Ontario (CA)

( * ) Notice: Subject to any disclaimer, the term of this patent is extended or adjusted under 35 U.S.C. 154(b) by 0 days.

(21) Appl. No.: 09/965,798

(22) Filed: Oct. 1, 2001

(51) Int. Cl.$^7$ .............................................. G01G 21/28
(52) U.S. Cl. ..................... 177/126; 177/127; 177/171; 177/173; 177/191; 177/197; 177/206; 177/214; 177/275; 177/246; 177/DIG. 3
(58) Field of Search ................................ 177/126, 127, 177/171, 172, 173, 177, 191, 197, 206, 213, 214, 235, 246, DIG. 2, DIG. 3, 249

(56) References Cited

U.S. PATENT DOCUMENTS

| | | | | |
|---|---|---|---|---|
| 205,684 A | | 7/1878 | Rogers | 177/127 |
| 371,831 A | * | 10/1887 | Fisher | 177/249 |
| 555,881 A | * | 3/1896 | Prescott | 177/249 |
| 634,162 A | | 10/1899 | Bracktle | 177/127 |
| 679,010 A | * | 7/1901 | Winans | 177/249 |
| 783,329 A | | 2/1905 | Sweet | 177/127 |
| 891,768 A | * | 6/1908 | Fritz | 177/249 |
| 1,105,891 A | * | 8/1914 | Dogde | 177/249 |
| 1,180,380 A | * | 4/1916 | Dodge | 177/249 |
| 1,302,085 A | * | 4/1919 | Peterson | 177/249 |
| 2,665,898 A | * | 1/1954 | Campbell | 177/249 |
| 3,061,026 A | * | 10/1962 | Hecox et al. | 177/210 R |
| 3,082,833 A | | 3/1963 | Myers | 177/127 |
| 3,659,664 A | * | 5/1972 | Knothe et al. | 177/210 R |
| 3,698,493 A | | 10/1972 | Yamanaka et al. | 177/25.13 |
| 3,797,596 A | * | 3/1974 | Tanji et al. | 177/210 R |
| 3,826,318 A | * | 7/1974 | Baumgartner | 177/25.13 |
| 3,967,271 A | * | 6/1976 | Day | 341/6 |
| 3,968,849 A | | 7/1976 | Dale et al. | 177/127 |
| 4,050,531 A | | 9/1977 | Ashbrook | 177/198 |
| 4,072,201 A | * | 2/1978 | Wiesler | 177/210 R |
| 4,094,371 A | * | 6/1978 | Ferrell | 177/210 R |
| 4,102,420 A | * | 7/1978 | Uyama et al. | 177/25.13 |
| 4,347,905 A | * | 9/1982 | Berckes | 177/149 |
| 4,494,620 A | | 1/1985 | Knothe et al. | 177/25.13 |
| 4,554,189 A | * | 11/1985 | Marshall | 428/11 |
| 4,744,428 A | | 5/1988 | Knotter et al. | 177/127 |
| 4,761,314 A | * | 8/1988 | Marshall | 428/11 |
| 4,858,709 A | | 8/1989 | Stahl | 177/164 |
| D307,354 S | | 4/1990 | Knotter et al. | D3/294 |
| 4,927,015 A | * | 5/1990 | Jones | 205/315.9 |
| 5,560,315 A | * | 10/1996 | Lampe | 119/51.5 |
| 5,830,034 A | * | 11/1998 | Ciechanowski et al. | 446/219 |
| 5,921,841 A | * | 7/1999 | Coleman et al. | 446/267 |
| 6,059,676 A | * | 5/2000 | Seymour et al. | 473/570 |
| 6,186,634 B1 | * | 2/2001 | Pitts | 362/84 |

* cited by examiner

*Primary Examiner*—Randy Gibson
(74) *Attorney, Agent, or Firm*—Greenblum & Bernstein, P.L.C.

(57) ABSTRACT

A portable scale is provided that includes a fulcrum, a balance beam pivotally mounted on the fulcrum, the balance beam supporting a load pan on one end and including an elongated portion having a measurement strip extending along the elongated portion of the balance beam. The portable scale includes a dynamic weight movable along the elongated portion of the balance beam. The dynamic weight includes a display unit on the elongated portion of the balance beam for detecting the location of the dynamic weight along the measurement strip, for electrically converting the location to a weight measurement, and for displaying the weight measurement. The portable scale may include luminescent material.

35 Claims, 10 Drawing Sheets

PORTABLE DIGITAL READOUT SCALE

BACKGROUND OF THE INVENTION

1. Field of the Invention

The present invention relates to the field of lightweight, pocket-sized or portable scales and improvements thereto.

2. Description of Related Art

Portable balance beam scales with integrated carrying cases are well known in the art. A typical scale includes a fulcrum projecting from a base, which may double as the bottom half of the carrying case, as disclosed, for example, by U.S. Pat. No. 4,744,428 to KNOTTER et al. and U.S. Pat. No. 3,968,849 to DALE et al. The typical scale also includes a balance beam positioned across the fulcrum, with a load pan on one end and a graduated scale on the other end. The pan and the graduated scale are disposed on opposite sides of the fulcrum, so that a slidable weight (or weights) can be moved along the balance beam in order to balance the load in the pan. When the load pan and the slidable weight are in equilibrium (i.e., the balance beam is balanced in a horizontal position), the weight of the load in the load pan is equal to the number (or numbers) on the graduated scale next to which the slidable weights are positioned.

The prior art also includes a type of scale that incorporates a balance beam with a load pan on one side of a fulcrum and a weight pan on the other side of the fulcrum, as disclosed, for example, by U.S. Pat. No. 4,050,531 to ASHBROOK. In a portable scale having this design, a load to be weighed is placed in the load pan and balancing weights of known mass are placed in the weight pan, until the pans are in equilibrium (i.e., the beam is horizontally balanced) across the fulcrum. The weight of the load is then determined to be equal to the sum of the balancing weights.

To be effective, a portable sliding weight scale must be balanced whenever the sliding weight is set in the zero position. Achieving an appropriate balance is problematic for a portable scale because the load pan must be as lightweight as possible to keep the overall weight of the scale at a minimum. Therefore, a measuring weight positioned on the balance beam opposite the load pan must be light weight as well, or the scale will not be in equilibrium when the load pan is empty and the measuring weight is in the zero position. However, the measuring weight must be heavy enough to accurately weigh loads up to several grams or ounces in order to have practical use.

One attempt to address the zero position balancing problem in the prior art was to place the bulk of the measuring weight in a vertical plane of the fulcrum whenever the measuring weight is in a zero position, as in U.S. Pat. No. 4,744,428 to KNOTTER et al. The positioning prevents the measuring weight from factoring into the balancing of the empty load pan. However, to position the measuring weight in the scale's fulcrum requires a convoluted design of the measuring weight housing because, while the bulk of the weight is positioned in a plane of the fulcrum, an indicator of the weight must be adjacent to the zero position on the sliding scale. The additional material and the unorthodox design for the measuring weight housing increase manufacturing costs.

Digital scales are also known in the prior art. Digital scales have many features, including an easy to read and precise display of the article weight. One such digital scale is disclosed, for example, by U.S. Pat. No. 3,698,493 to YAMANAKA et al. The YAMANAKA et al. scale includes a cradle for supporting the article to be weighed, a system of links, a spring having a spring force that balances the weight of the article, a code plate disc and a photoelectric element for reading the change in the link system caused by the weight of the article. The device includes a code generator for processing the output of the photoelectric element, and a digital indicator for displaying the weight in digital form.

Another digital scale is disclosed, for example, by U.S. Pat. No. 4,858,709 to STAHL. The STAHL device includes a weighing cell, an analog/digital converter for converting the signal of the weighing cell, and a microprocessor for receiving a signal from the analog/digital converter, and calculating and displaying the weight of the article.

Another digital scale is disclosed, for example, by U.S. Pat. No. 4,494,620 to KNOTHE et al. The KNOTHE et al. device incudes a load pan for receiving the article to be weighed, a liquid filled container having a gas bubble, a photosensitive receiver for detecting the position of the gas bubble (which position is dependent on the weight of the article), a digitizer, and a microprocessor for converting the digitized value to a weight measurement.

A disadvantage of the prior art is the absence of portable digital balance beam scales. The prior art analog portable scales can be difficult to read, due to the small size of the device. However, a digital scale is easy to read, with a clear liquid crystal display.

Another disadvantage of the prior art is the lack of precision of a weight reading on an analog scale. In the analog scale, it is difficult to obtain a precise measurement of the weight of the load, due to the size of the graduations on the scale, and the pointer on the dynamic weight. However, in a digital scale, the liquid crystal display digital reading gives a precise weight value.

SUMMARY OF THE INVENTION

The present invention is directed to a portable digital readout scale, which addresses the problems existing in the prior art, discussed above.

An aspect of the present invention provides a portable scale including a fulcrum, a balance beam pivotally mounted on the fulcrum, the balance beam supporting a load pan on one end and including an elongated portion having a measurement strip thereon extending from a first end toward a second, opposite end of the elongated portion of the balance beam, wherein the fulcrum is positioned between the load pan and the first end of the elongated portion, and a dynamic weight movable along the balance beam from the first end to the second end of the elongated portion of the balance beam, the dynamic weight including a display unit on the elongated portion of the balance beam for detecting the location of the dynamic weight along the measurement strip, for electrically converting the location to a weight measurement, and for displaying the weight measurement.

According to a further aspect of the present invention, the portable scale may further include a thumb wheel mounted on the balance beam, a stop mounted on the second end of the elongated portion of the balance beam, an elongated spindle having two ends, one of the two ends of the spindle being mounted in the thumb wheel for turning therewith, and the other of the ends being mounted at the stop, and a nut mounted on the dynamic weight for engagement with the spindle, wherein the dynamic weight can be moved along the elongated portion of the balance beam by turning the thumb wheel and the spindle therewith, which in turn moves the nut and the dynamic weight along the balance beam. In the portable scale of the present invention, the nut may further include a half nut and the dynamic weight may further include a pivot having a pivot axis perpendicular to the axis of the elongated spindle such that the dynamic weight can be pivoted about the pivot axis to lift the half nut off the spindle, to make coarse weight adjustments. In the portable scale of the present invention, the dynamic weight may further include a pair of slider bases for engagement with the sides of the balance beam and a bracket for holding the nut, such that the pair of slider bases slides along the edges of the balance beam as the nut and the dynamic weight move along the balance beam.

According to a further aspect of the present invention, the dynamic weight is removable and replaceable, enabling variations in a measurement range of the portable scale.

According to a further aspect of the present invention, the dynamic weight may further include a push button for resetting the weight measurement to zero. The portable scale of the present invention may further include a dynamic weight having a push button for switching between different systems of measurement.

In a further aspect of the present invention, a portable scale is provided including a base, a pair of fulcrum posts projecting from the base, a balance beam pivotally supportable on the pair of fulcrum posts, the balance beam including a load pan support member on one end and an elongated portion having a measurement strip thereon extending from the first end toward a second, opposite end of the elongated portion, the pair of fulcrum posts positioned between the load pan support member and the first end of the elongated portion of the balance beam, a load pan pivotally supported by the load pan support member, a dynamic weight member movably mounted on the balance beam for movement along the elongated portion, the dynamic weight including a display unit on the elongated portion of the balance beam for detecting the location of the dynamic weight member along the measurement strip, for electrically converting the location to a weight measurement, and for displaying the weight measurement, and a stationary counter weight attached to the load pan support member, wherein the stationary counter weight balances against the dynamic weight member when the dynamic weight is located at a zero position of the measurement strip on the balance beam.

According to a further aspect of the present invention, the portable scale may further include a carrying case, the carrying case including a top portion and a bottom portion, the top portion being closable onto the bottom portion and wherein the bottom portion includes the base of the portable scale.

According to a further aspect of the present invention, the measurement strip may include a printed circuit board having a pattern thereon for indicating the location of the dynamic weight member along the balance beam.

According to a further aspect of the present invention, the measurement strip may include an inlayed strip of copper or glass and a pattern etched into the inlayed strip for indicating the location of the dynamic weight member along the balance beam.

According to a further aspect of the present invention, the portable scale may further include luminescent material. The portable scale of the present invention may further include plastic material having luminescent pigment therein. The portable scale of the present invention may further include plastic material having phosphorescent material therein. The portable scale of the present invention may further include material which glows under ultraviolet light.

According to a further aspect of the present invention, a portable scale and carrying case combination is provided including a portable scale, and a carrying case for holding the portable scale, wherein the carrying case includes luminescent material. The portable scale and carrying case combination may further include a carrying case including plastic material having luminescent pigment therein. The portable scale and carrying case combination may further include a carrying case including plastic material having phosphorescent material therein. The portable scale and carrying case combination may further include a carrying case including luminescent material which glows under ultraviolet light.

According to a further aspect of the present invention, the portable scale and carrying case combination includes components for weighing a load, wherein the components include luminescent material. The portable scale and carrying case combination of the present invention may further include plastic having luminescent pigment therein. The portable scale and carrying case of the present invention may further include plastic material having phosphorescent material therein. The portable scale and carrying case combination of the present invention may further include material which glows under ultraviolet light.

BRIEF DESCRIPTION OF THE DRAWINGS

The above and other objects, features and advantages of the present invention will be made apparent from the following description of the preferred embodiments, given as nonlimiting examples, with reference to the accompanying drawings in which.

DETAILED DESCRIPTION OF THE INVENTION

Figure 1A:
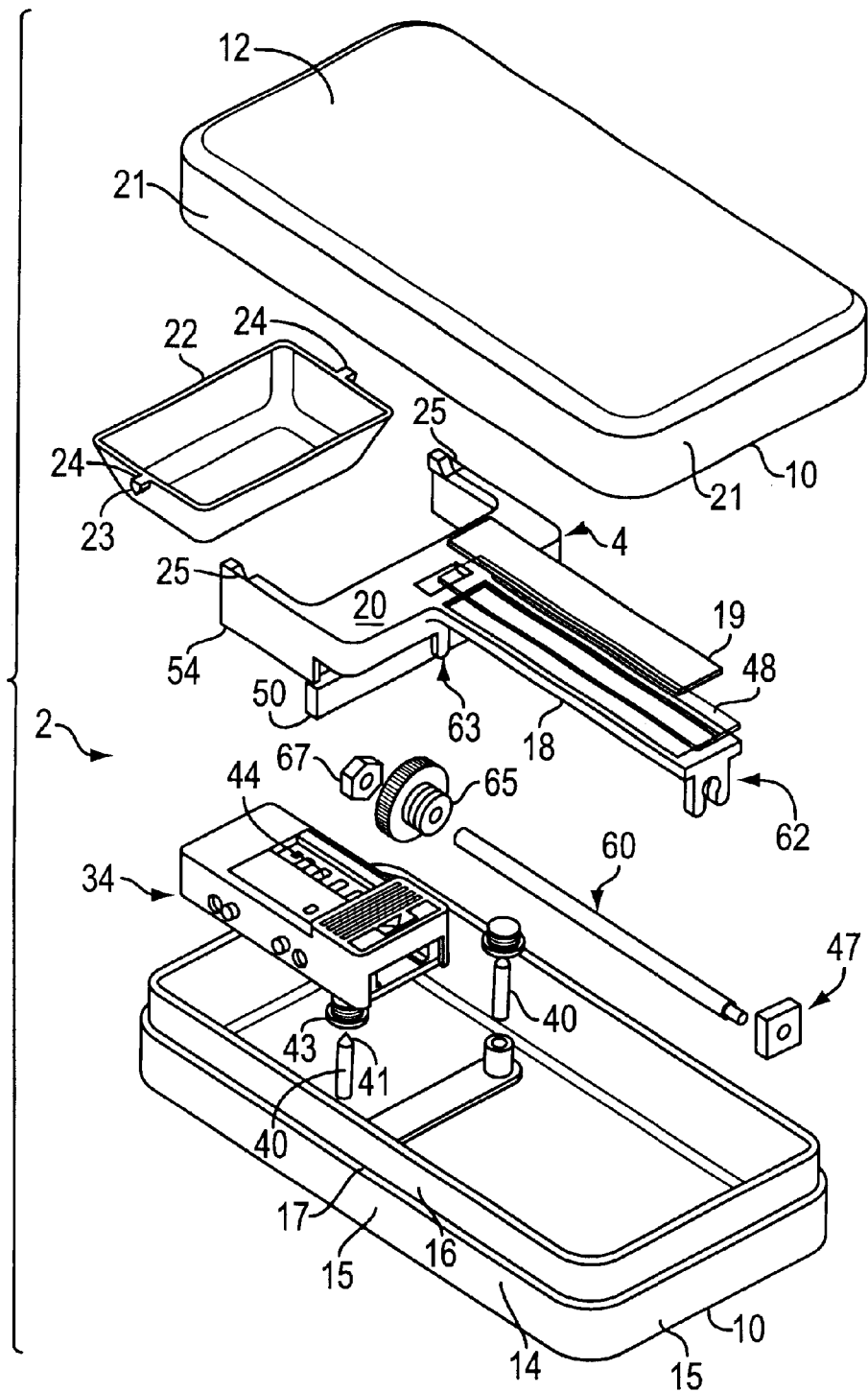
FIG. 1A is an exploded, top perspective view of the scale and an open carrying case, according to one embodiment of the present invention.

The present invention is directed to a lightweight, portable (i.e., pocket-sized) digital readout scale contained in an integrated carrying case. An object of the invention is to provide a scale that is compact, inexpensive and easy to use, yet capable of providing accurate and reliable weight measurements. Another object of the invention is to provide a low-cost, durable carrying case small enough to fit conveniently into a pants or coat pocket, a handbag, an automobile glove compartment or similar convenient location. Another object of the invention is to provide a scale with a digital readout.

With reference to FIGS. 1–7 of the drawings, reference numeral 2 denotes the portable digital readout scale and carrying case combination of the present invention. The integrated scale and carrying case combination 2 includes a balancing beam scale 4 assembled on a carrying case 10, as shown in FIGS. 1A and 1B. Generally, to measure the weight of a load (such as, e.g., an article or articles, a liquid, or granular materials), the user places the load into a load pan or bucket 22, and balances the scale 4 using a dynamic weight member or slider 34, which is positioned on a balance beam or elongated portion 18 on the opposite side of fulcrum posts 40 from the load pan or bucket 22. The measurement increases as the dynamic weight member or slider 34 is moved progressively from a zero or first end position 28 of the graduated scale 19 toward the opposite end 29 of the balance beam 18. When the scale 4 is in equilibrium, i.e., the dynamic weight member or slider 34 is positioned such that the balance beam 18 is horizontal, the weight of the load is equal to the measurement units (e.g., grams or ounces) displayed on the digital display 44 on the dynamic weight member or slider 34.

Figure 2:
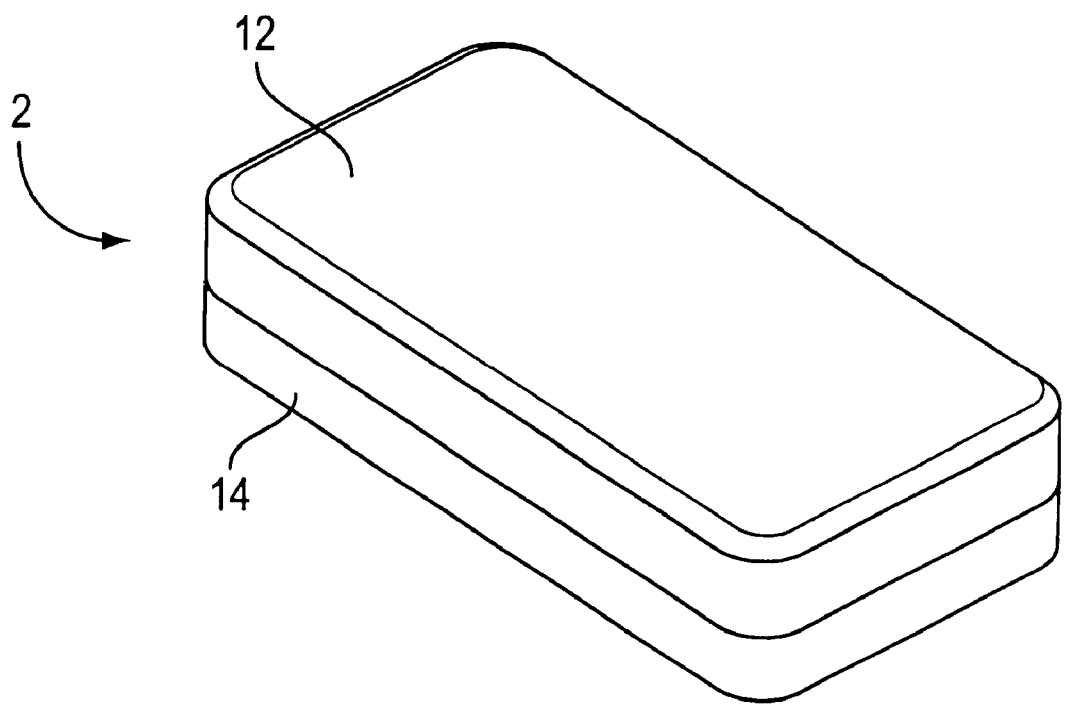
FIG. 2 is a perspective view of the carrying case of the embodiment of FIG. 1A in the closed position.

The scale 4 is contained in the carrying case 10, which may be made of any suitable material, for example, a plastic or other lightweight, durable polymeric material. FIG. 2 depicts a rectangular shaped carrying case 10, according to one embodiment of the invention, in the closed position. However, it should be understood that the carrying case 10 could be of any suitable shape, such as tear-drop or oval. Further, the carrying case 10 is low in height, being slightly higher than the load pan or bucket 22 and the balance beam 18, when the scale 4 is assembled and positioned on the fulcrum posts 40.

The close fit of the carrying case 10 around the scale 4 secures the scale 4 in position on the fulcrum posts 40 when the carrying case 10 is in the closed position, preventing the scale 4 from moving freely inside the closed carrying case 10. The assembled scale 4 therefore is not disrupted during transport, enabling immediate use of the scale 4 upon opening of the carrying case 10.

In an embodiment of the invention, the carrying case 10 includes a top portion 12 and a bottom portion 14, as shown in FIG. 1A. The bottom portion 14 may include sidewalls 15 extending around the perimeter of the bottom portion 14, including thin wall portions 16, forming a shelf 17. The top portion 12 includes sidewalls 21 that fit on the bottom portion 14, around the thin wall portions 16 and resting on the shelf 17. The fit between the top portion 12 and the bottom portion 14 may be, for example, a press fit, or a snap fit. However, alternative means known to those of ordinary skill in the art may be used for fitting the top portion 12 on the bottom portion 14.

In an alternative embodiment, the carrying case 10 may include a top portion and a bottom portion joined by a hinge. A hinge assures accurate alignment of the top portion and the bottom portion when the carrying case is in the closed position. Also, a hinge prevents separation of the top portion from the bottom portion, so that the top portion is not misplaced while the scale is in use. The hinge may be formed unitarily and in one piece from the top portion and the bottom portion, respectively, of the carrying case, so that the hinge is not a separate attachment. Because the hinge is not a separate attachment, the manufacturing and assembly processes are simplified, and therefore at lower cost. Also, the finished product is generally more durable, since the adequacy of the attachment and potential failure of the attachment means (e.g., screws, rivets, interlocking tabs) is not a concern.

The carrying case 10 may further include a latching mechanism on the sidewalls. As with the hinge, the latching mechanism may be formed unitarily and in one piece from the top portion and the bottom portion, respectively, of the carrying case 10, so that the latching mechanism is not a separate attachment. An interlocking latch mechanism mechanically secures the top portion and the bottom portion, preventing inadvertent opening of the case 10 during transport, and possible loss of the scale or any of the scale's removable parts (e.g., the load pan or bucket 22 and the dynamic weight slider 34).

In an alternative embodiment, the hinge could be replaced with a second latching mechanism. In this embodiment, the top portion 12 would be removable from the bottom portion 14, but the carrying case 10 would not differ in other respects.

Figure 1B:
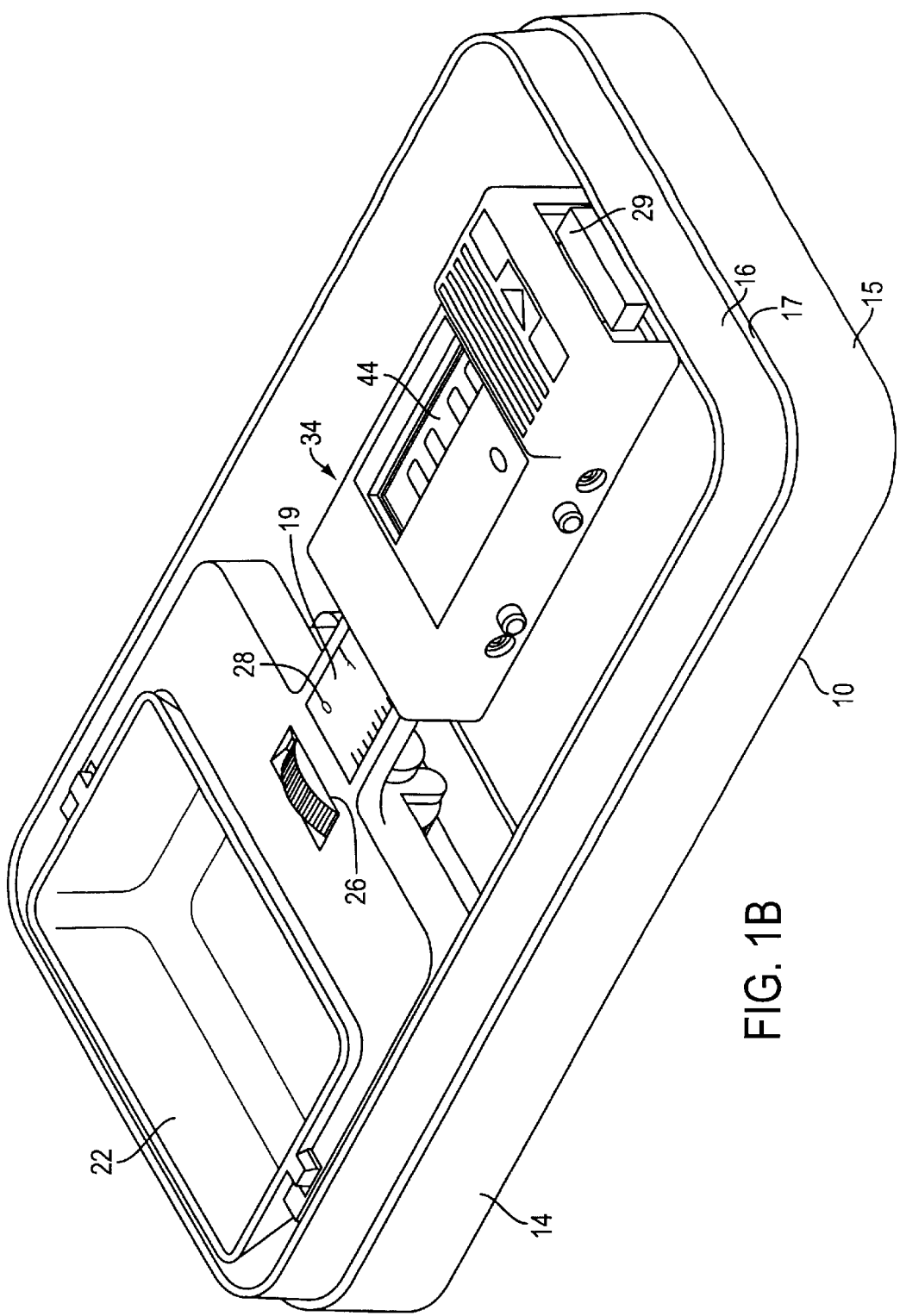
FIG. 1B is a top perspective view of the scale of FIG. 1A, assembled and positioned in the open carrying case.
Figure 3:
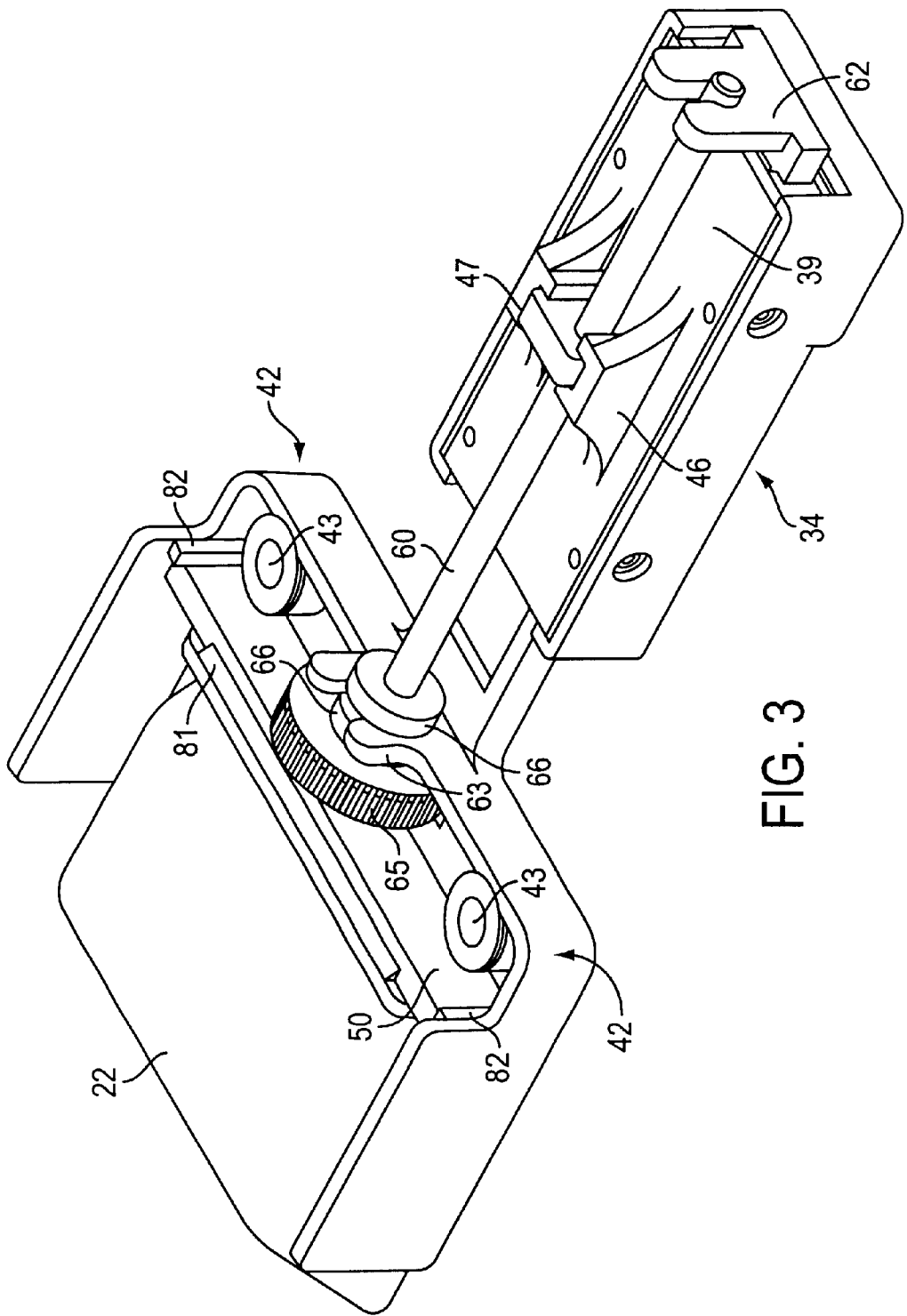
FIG. 3 is a bottom perspective view of the balance beam, without the carrying case, according to the embodiment of FIG. 1A.
Figure 4:
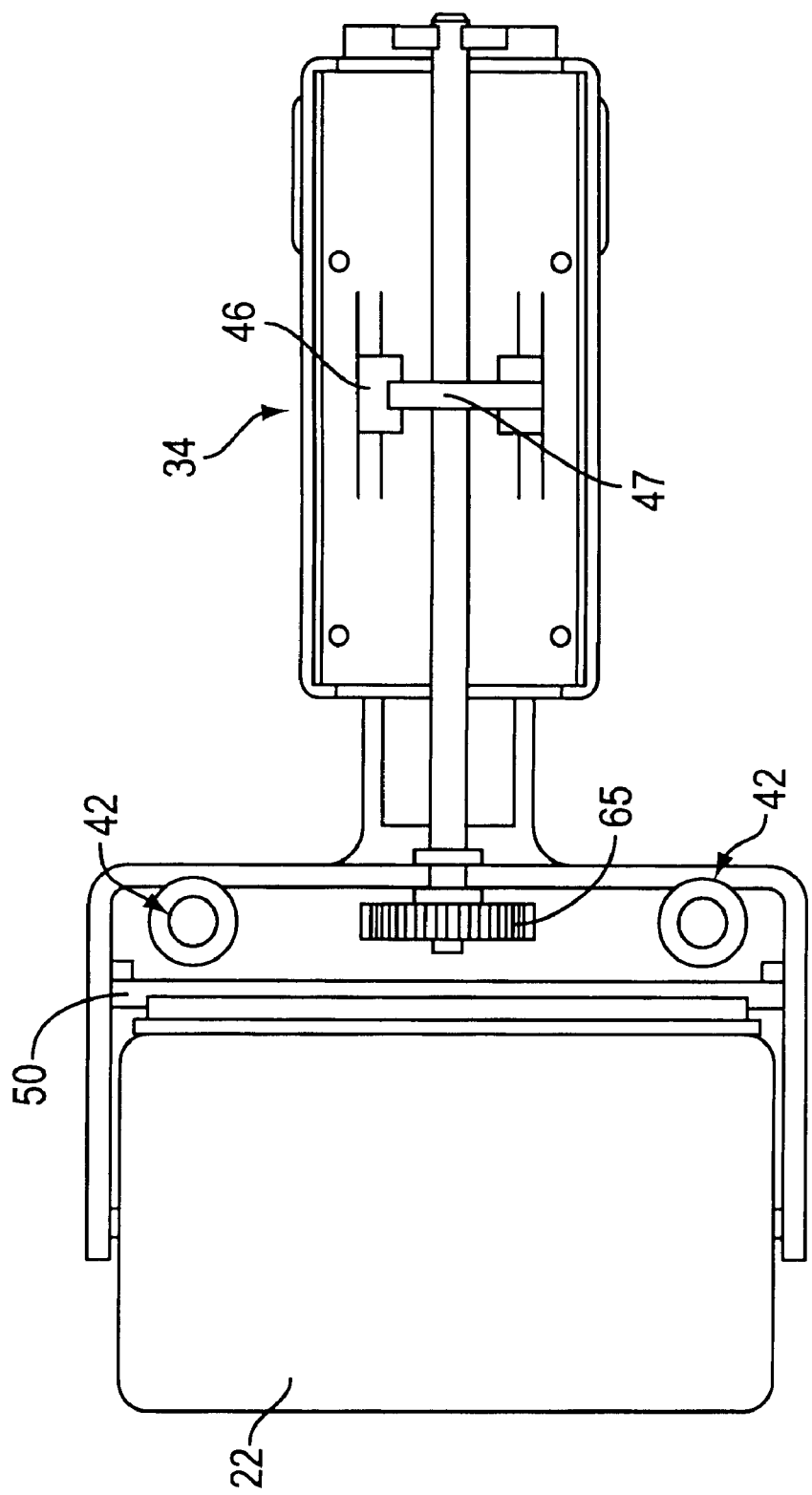
FIG. 4 is a bottom plan view of the balance beam, without the carrying case, according to the embodiment of FIG. 1A.
Figure 6:
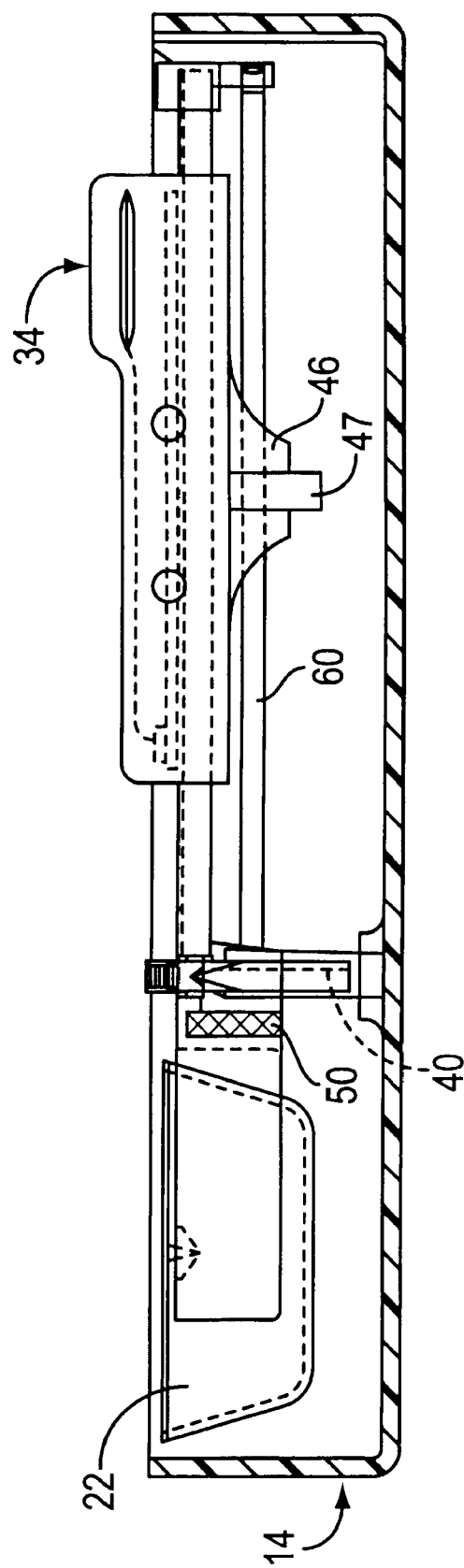
FIG. 6 is an enlarged side view of the invention with a portion of the case cut away, depicting the dynamic weight member in relation to a fulcrum post, according to the embodiment of FIG. 1A.

The bottom portion 14 of the carrying case 10 may function as the base of the scale 4, as shown in FIG. 1B. The pair of fulcrum posts 40 are mounted on the inner side of the bottom portion 14, protruding upwardly to engage a load pan support member 20 at pivot points 42 (FIGS. 3 and 6).

In an embodiment of the invention, the fulcrum posts 40 are metallic, to enhance reliability and durability, although the fulcrum posts 40 can be made from any material, such as a rigid polymeric material, capable of inflexibly supporting the combined weight of the assembled balance beam 18, the load pan 22 and the load being weighed. The fulcrum posts 40 may include conical tips 41, shown in FIG. 1A, which define points centered at the top of the vertical axis of each fulcrum post 40. In an embodiment, the conical tips 41 cooperate with recessed metallic inserts 43, located at the pivot points 42 on the load pan support member 20, as shown in FIG. 3. When the scale 4 is assembled, the center of each metallic insert 43 positionally corresponds to the apex of the conical tip 41 of the respective fulcrum post 40. The integration of the metallic inserts 43 and the conical tips 41 minimizes the contact area between the fulcrum posts 40 and the load pan support member 20, increasing freedom of movement of the balance beam 18. Also, because the conical tips 41 are accommodated in the recessed metallic inserts 43, the scale 4 is less likely to shift inadvertently from the center of the fulcrum posts 40 during the weighing process.

Figure 7:
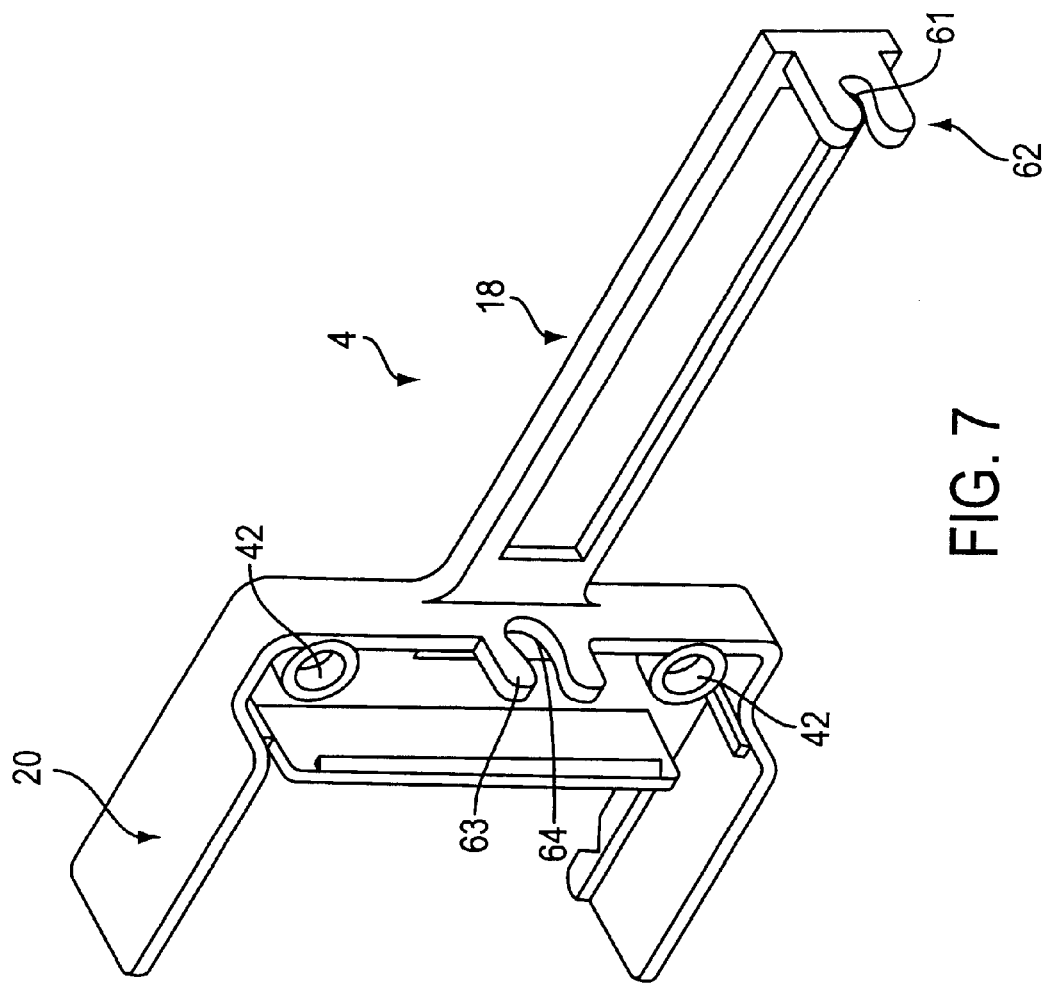
FIG. 7 is a side perspective view of the balance beam, according to the embodiment of FIG. 1A.

Referring to FIGS. 1A and 1B, the balancing portion of the scale 4 includes the balance beam 18, having at one end the load pan support member 20. The upper surface of the balance beam 18 may include a graduated scale 19. The graduated scale 19 begins at a first end or zero position 28 on the end of the balance beam 18 closest to the load pan support member 20, and extends toward the second or opposite end 29 of the balance beam 18. The graduated scale 19 has incremental demarcations for units of measurement. The balancing portion of the scale includes a turnscrew or spindle 60 extending along the length of the balance beam 18 for driving the dynamic weight member up and down the balance beam 18. As shown in FIGS. 3 and 7, a first end of the spindle 60 is received in a groove 61 in a bracket 62 extending from the lower side of the opposite end 29 of the balance beam 18. The bracket 62 also functions as a stop, preventing the dynamic weight member or slider 34 from sliding off the end of the balance beam 18. A second bracket 63 having extending portions forming a groove 64 extends from the lower side of the load pan support member 20. A thumb wheel 65 is mounted on the second end of the spindle 60. The thumb wheel 65 includes two flanges 66 with a space therebetween for receiving the extending portions on the second bracket 63. Assembled for operation, the first end of the spindle 60 is received in the groove 61 in the first bracket 62. The second end of the spindle 60 is secured to the thumb wheel 65 with a hex nut 67 (shown in FIG. 1A), and the extending portions on the second bracket 63 are received between the two flanges 66 of the thumb wheel 65, with the spindle 60 in the groove 64. The thumb wheel 65 protrudes from a slot 26 in the load pan support member 20. Thus secured, the spindle 60 is rotatable with the thumb wheel 65 so that when the thumb wheel 65 is turned, the spindle 60 is turned therewith.

Figure 5:
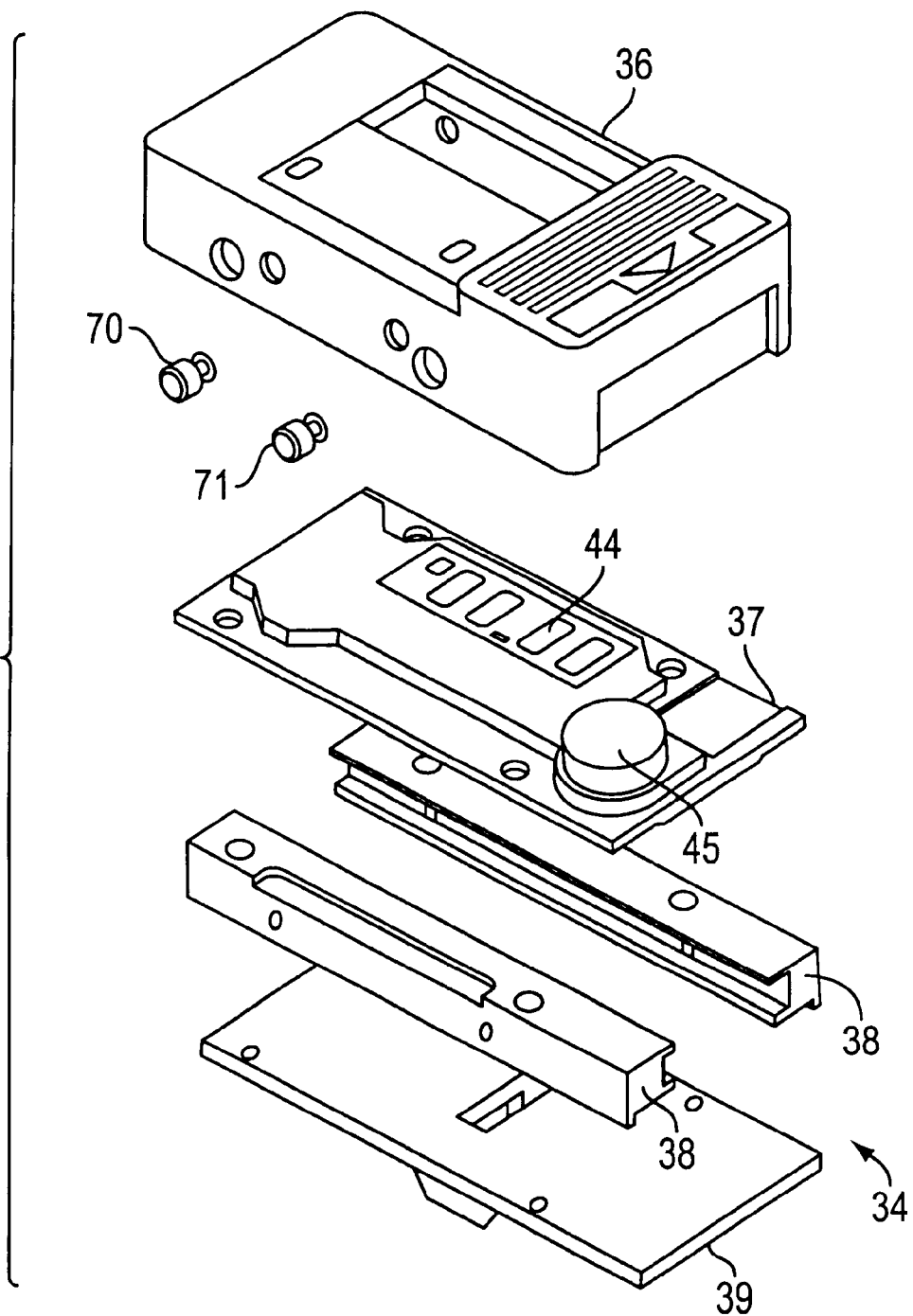
FIG. 5 is an exploded perspective view of a slider, according to the embodiment of FIG. 1A.

The dynamic weight member 34 is mounted to be slidable along the balance beam 18. As shown in FIG. 5, the dynamic weight member or slider 34 includes a cover 36, a display unit, such as a liquid crystal display (LCD) 37, first and second slider bases 38, and a bottom plate 39. The LCD 37 includes a display 44 and a battery 45. As shown in FIG. 3, the bottom plate 39 includes a bracket 46 for receiving a square nut 47. The threads of the square nut 47 can be mated with the threads of the spindle 60. The dynamic weight member 34 is assembled around the balance beam 18 so that the first and second slider bases 38 engage and slide along the side edges of the balance beam 18. The square nut 47 is inserted into the bracket 46, and the spindle 60 is threaded onto the square nut 47. The ends of the spindle 60 are mounted in the brackets 62,63 as described above. When the spindle 60 and the dynamic weight member 34 are fully assembled, as described above, onto the balancing portion 4, turning the thumb wheel 65 causes the spindle 60 to turn, which will move the square nut 47 and the dynamic weight member or slider 34 therewith, along the length of the spindle 60 due to the mating of the threads of the spindle 60 and the square nut 47. Turning the thumb wheel 65 in one direction will move the square nut 47 and the dynamic weight member or slider 34 from the first end or zero position 28 to the second or opposite end 29 of the balance beam 18; and turning the thumb wheel 65 in the opposite direction will move the square nut 47 and the dynamic weight member or slider 34 from the opposite end 29 to the zero position 28 of the balance beam 18.

In an embodiment of the invention, the scale includes a measurement strip, such as an encoding strip 48, on the upper surface of the balance beam extending from the zero position 28 to the opposite end 29. The encoding strip 48 has markings which indicate the location along the balance beam. There may be a cover, such as the graduated scale 19, over the measurement strip. The display unit 37 may include components for reading the encoding strip 48 and for processing the reading taken, as is well known to one of ordinary skill in the art. However, in the instant invention, the components calculate the weight of the load from the reading, and deliver the calculated weight to the digital display 44, as described hereinafter. The components determine the location of the dynamic weight 34 from a reading of the encoding strip 48. Then the location is converted to a weight reading. The components may be programmable to calculate the weight of the load from the location of the dynamic weight member and the weight of the counterweight (to be described later). The encoding strip 48 may include a printed circuit board (PCB) with a pattern thereon. The components detect the pattern on the encoding strip 48 as the dynamic weight member 34 is moved along the balance beam 18, and convert the displacement of the dynamic weight member into the weight of the load. The weight reading may be displayed in any desired units, such as grams or karats. In other words, the components are programmed so that a certain displacement of the dynamic weight member equals a certain weight of the load. Thus, the dynamic weight member or slider 34 moves along the balance beam 18 and the components detect the pattern on the PCB, the reading is converted to a weight, and the weight is displayed on the digital display.

The components may also be capable of sending weight measurement readings to computers or data collectors.

Alternatively, the measurement device may include a capacitance system, as is used in electronic calipers. In this system, there is an inlayed measurement strip on the balance beam 18. The inlayed measurement strip includes a pattern etched into a copper or glass strip, stretching the length of the balance beam 18. A surface of the dynamic weight member or slider 34 facing the inlayed measurement strip on the balance beam 18 also includes an inlayed measurement strip, including a pattern etched into a copper or glass strip. The pattern on the inlayed measurement strip on the balance beam 18 and the pattern on the surface of the dynamic weight member or slider 34 move past each other when the dynamic weight member or slider 34 is moved along the balance beam 18. During such movement, the pattern on the surface of the dynamic weight member 34 comes into and out of alignment with the pattern on the inlayed measurement strip on the balance beam 18. This alignment and misalignment of the patterns sends signals identifying the location of the dynamic weight member or slider 34 along the balance beam 18, to the components within the slider 34. The components receive these signals, and convert the signals to a weight measurement. Then, the converted weight measurement is displayed on the display 44 on the LCD 37.

In a further embodiment, the measurement device may measure the displacement of the dynamic weight member optically. Optical sensors may be included, in a manner known to one of ordinary skill in the art. For example, the dynamic weight member or slider 34 may include an optical sensor to sense the distance from the dynamic weight member 34 to a stationary point on the balance beam 18. This point could be, for example, a point at the first or zero end 28 of the balance beam 18. The balance beam 18 could include a downwardly extending member, such as the bracket 63, which could be easily detected by an optical sensor on the dynamic weight. The distance detected could be converted by the components into a weight measurement.

In an alternative embodiment, the optical sensor detects the graduation marks on the graduated scale 19 on the upper surface of the balance beam 18 as the dynamic weight member 34 moves along the balance beam 18. Then the displacement of the dynamic weight member 34 is converted from a distance measurement to a weight measurement, and the weight measurement is displayed on the digital display 44.

Alternatively, the upper surface of the balance beam 18 and the dynamic weight member 34 each may include a series of electrical contacts, in a manner known to one of ordinary skill in the art. As the dynamic weight member 34 moves along the balance beam 18, the contacts pass each other to determine the displacement of the dynamic weight member. The displacement is converted to a weight, as described above.

The dynamic weight member or slider 34 may further include a zero button 70. Pressing the zero button 70 resets the LCD 37 to a zero measurement. Thus, the device may be zeroed at the zero position 28 or at any other position.

The balancing process is performed by first resetting or zeroing the device. With the load pan empty, the slider 34 is moved along the balance beam 18 until the balance beam is in a horizontal position and balanced. Then, the zero button 70 is pushed to reset the LCD 37 to zero. Then the weighing process may begin. A load to be weighed is deposited into the load pan or bucket 22, which is supported by the load pan support member 20. The user then slides the dynamic weight member or slider 34 along the balance beam 18, until the scale 4 is balanced (i.e., the balance beam 18 is balanced across the fulcrum posts 40 in a horizontal position), to obtain a weight measurement. The measured weight of the load can then be read from the display 44.

The zero button 70 may also be used to zero the LCD 37 while the load pan 22 contains a load. For example, the load pan 22 may contain a tare weight. The tare weight would be loaded into the load pan 22, and the zero button 70 pushed to zero the LCD 37. Then, more of the load is added, until the desired amount is in the load pan 22.

Alternatively, the device may be used by moving the slider 34 along the balance beam 18 to a desired weight reading, and then filling the load pan 22 until the beam balances, to obtain a desired amount of a certain load.

The dynamic weight member or slider 34 may also include an additional push button 71. This push button 71 changes the display of weight units. For example, a push of the button 71 could change the display from English units, such as karats or ounces, to metric units, such as milligrams. Pushing the button 71 a second time would change the display from metric units back to English units.

The dynamic weight member or slider 34 may have, for example, a generally rectangular shape, as shown in FIG. 5.

Located at one end of the balance beam 18 is the load pan support member 20, which supports the load pan 22, as shown in FIGS. 1A and 1B. The load pan support member 20 and the load pan 22 are located on the opposite side of the fulcrum posts 40 from the graduated scale 19. The load pan 22 may be concave (i.e., bowl-shaped) and substantially rectangular. The concave shape causes the load being weighed to shift toward the center of the load pan 22, automatically centering the load. The load pan 22 is therefore able to contain for weighing various types of loads, including liquids and granular materials, with a reduced risk of spilling. The load pan 22 is made from any durable lightweight material, such as plastic. It is preferable that the material also be waterproof, so that measurement of loads in liquid form can be performed. As discussed above, the load pan support member 20 includes the pivot points 42, which correspond to the fulcrum posts 40. The pivot points 42 include, in an embodiment, recessed metal inserts 43 that communicate with the pointed tips 41 of the fulcrum posts 40.

The load pan support member has a generally u-shaped yoke 54, with the open portion of the yoke 54 facing away from the balance beam 18, as shown in FIGS. 1A and 3. The yoke 54 includes a generally v-shaped notch 25 on each arm of the yoke and diametrically opposed to one another. Referring to FIG. 1A, the notches 25 receive corresponding generally v-shaped tabs 23 projecting from below supports 24, which are attached to opposite sides of the load pan 22. The cooperation of the v-shaped tabs 23 of supports 24 with the v-shaped notches 25 assures proper placement of the load pan 22 onto the yoke 54, while also permitting the load pan 22 to pivot about an imaginary line connecting the opposing notches 25. The pivoting motion allows the load pan 22 to remain substantially horizontal as the scale 4 pivots about the fulcrum posts 40, even when a relatively heavy load to be weighed is placed into the load pan 22, causing the scale to tip significantly toward the load pan 22 side of the fulcrum posts 40. By pivoting toward a horizontal orientation, the load pan 22 maintains a position that helps to prevent its contents from spilling over the sides, even where the contents are in liquid form.

Referring to FIG. 3, the load pan support member 20 also includes a stationary counter-weight or trim weight 50, mechanically attached to the underside of the load pan support member 20. As shown in FIG. 3, the counter-weight or trim weight 50 fits along a portion of the outer edge of the yoke 54. The counter-weight 50 is fastened in place by a lip 81, in conjunction with a pair of brackets 82. The lip 81 secures the counter-weight 50 in place by pressing it against lower surface of the u-shaped yoke 54. The counter-weight 50 is therefore held securely in place, so that it does not shift during movement of the scale 4, disrupting the weighing process. The counter-weight 50 can be removed and replaced with one having a different weight, as discussed below.

In an embodiment of the invention, the stationary counter-weight 50 is made of a suitable metal, although any relatively dense material can be used. The stationary counter-weight 50 is weighted so that the scale 4 is in equilibrium whenever the dynamic weight member is at the zero position 28 on the balance beam 18. The device may also be zeroed anywhere along the length of the balance beam 18, as described above.

An advantage of attaching a separate stationary counter-weight 50 is that the size and weight of the load pan 22 need not be adjusted to counter-balance the dynamic weight members or slider 34.

In an alternative embodiment of the invention, the weight of counter-weight 50 can be increased to counter-balance a heavier dynamic weight member or slider 34. The scale 4 can therefore be easily adapted to measure loads within a range of heavier weights by simply adding a heavier weight member, in combination with a heavier counter-weight 50, without having to change any other structural elements of the scale and carrying case combination 2, including the load pan 22, the balance beam 18 and the carrying case 10.

Figure 8:
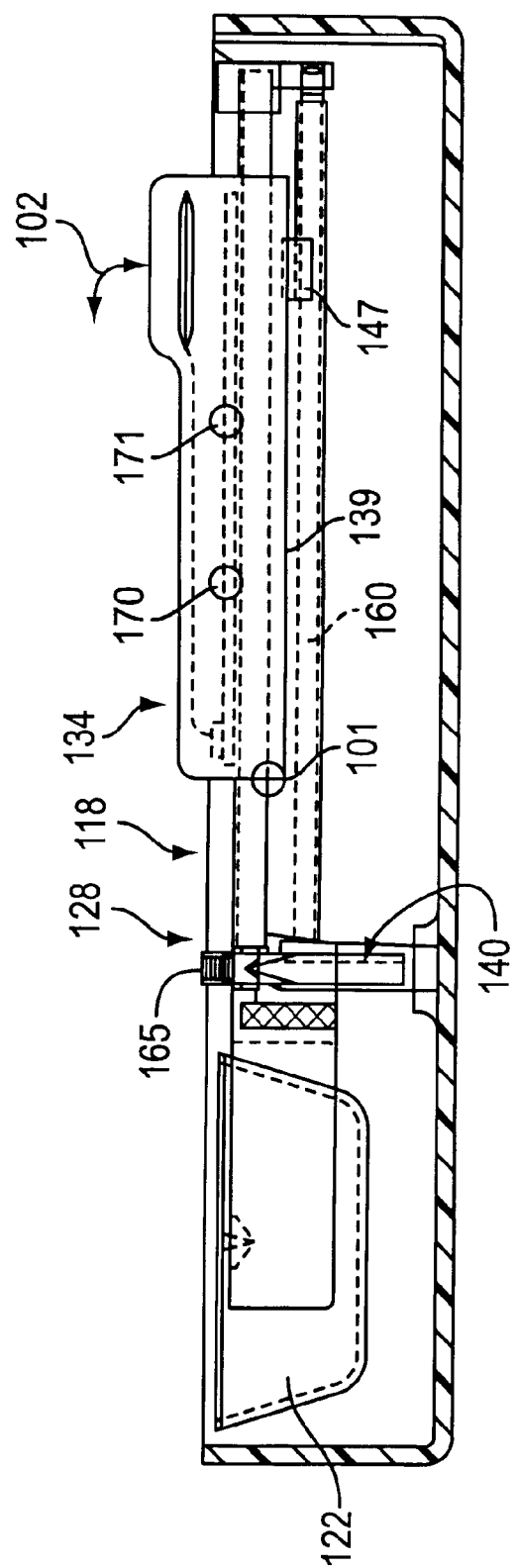
FIG. 8 is a side view of the invention with a portion of the case cut away, according to a second embodiment of the present invention.
Figure 9:
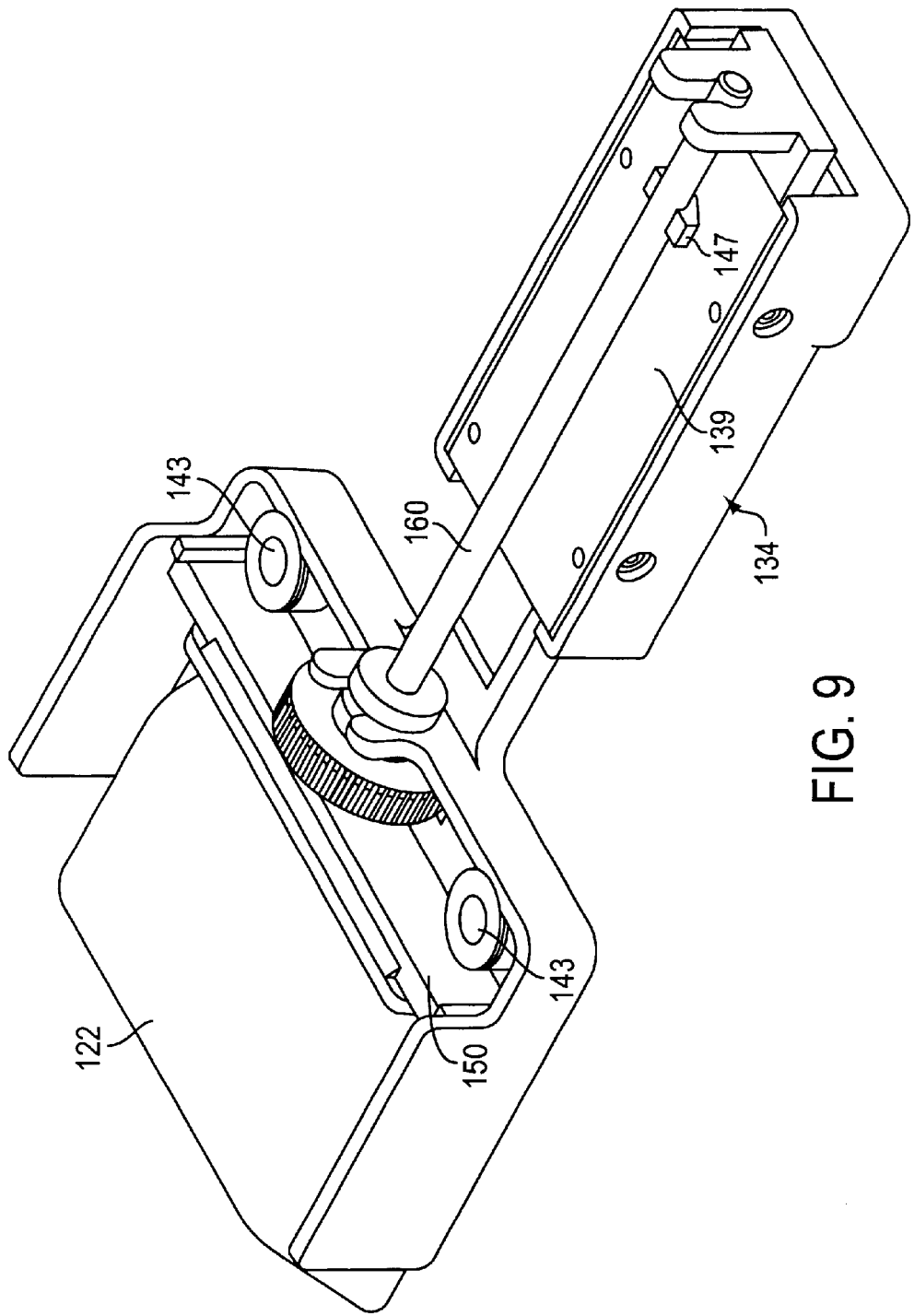
FIG. 9 is a bottom perspective view of the balance beam, without the carrying case, according to the embodiment of FIG. 8.

An alternative embodiment is shown in FIGS. 8 and 9, wherein the balance beam scale is able to perform coarse and fine weight measurement. In this embodiment, the square nut 47 is replaced with a half nut 147 secured to the lower side of the bottom plate 139. The half nut 147 has threads that mate with the threads on the spindle 160. The dynamic weight member or slider 134 includes a slider pivot 101. The slider pivot 101 is located on the lower side of the dynamic weight member 134, and the dynamic weight member 134 is mounted on the balance beam 118 so that the slider pivot 101 is positioned nearer to the first or zero position 128 of the balance beam 118 than to the opposite end 129. The dynamic weight member or slider 134 can be pivoted up around the axis of the slider pivot 101. The axis of the slider pivot 101 is substantially perpendicular to the axis of the spindle 160. When the dynamic weight member or slider 134 is pivoted up and around the slider pivot 101 to an up position (as shown by arrow 102), the threads of the half nut 147 and the spindle 160 become disengaged. In this up position with the threads disengaged, the dynamic weight member or slider 134 may be moved quickly along the spindle 160 for a coarse measurement. When the dynamic weight member or slider 134 is pivoted down and around the slider pivot 101 to a down position, the threads of the half nut 147 and the spindle 160 become engaged. In this down position, the dynamic weight member 134 can be moved along the balance beam 118 by turning the thumb wheel 165 so that the spindle 160 turns and the half nut 147 is moved along the spindle 160 for a fine measurement. The second embodiment also includes a counterweight 150, a zero button 170 and a push button 171.

In the alternative embodiment, the balancing process is performed by first resetting or zeroing the device as in the first embodiment. With the load pan 122 empty, the slider 134 is moved along the balance beam 118 until the balance beam 118 is in a horizontal position and balanced. Then, the zero button 170 is pushed to reset the LCD 137 to zero. Then the weighing process may begin. A load to be weighed is deposited into the load pan or bucket 122, which is supported by the load pan support member 120. The user then pivots the slider 134 up to disengage the half nut 147 and the spindle 160, and slides the dynamic weight member or slider 134 along the balance beam 118, until the scale 114 nears equilibrium, to obtain a coarse weight measurement. The graduated scale 119 may assist the user in choosing a location for the coarse weight measurement. Then the dynamic weight member or slider 134 is pivoted downward about the axis of the slider pivot 101 until the half nut 147 and the spindle 160 engage, and then the thumb wheel 165 is operated to move the slider 134 along the balance beam 118 until it is balanced (i.e., the balance beam 118 is balanced across the fulcrum posts 140 in a horizontal position), to obtain a fine weight measurement. The measured weight of the load can then be read from the LCD 137.

Another aspect of the present invention may include a portable scale that is luminescent, such as, for example, phosphorescent. The portable scale may include components and a carrying case constructed of plastic. Phosphorescent pigments may be incorporated into the plastic material of the case so that the case glows in the dark. Additionally, phosphorescent pigments may be incorporated into the plastic material of the components. The user may then easily retrieve and/or use the scale in a dark or dimly lit environment, such as, for example, a compartment, room, closet or pocket. Such components and case is not limited to any particular type of portable scale, and may be incorporated into any known portable scale, such as, for example, a balance beam scale, a spring scale, a load cell scale or a digital scale.

Another aspect of the present invention may include a portable scale that glows under ultraviolet light. The portable scale may include components and a carrying case constructed of plastic. Pigments may be incorporated into the plastic material of the carrying case so that the case glows under ultraviolet light. Additionally, pigments may be incorporated into the plastic material of the components so that the components glow under ultraviolet light. The user may then easily retrieve and/or use the scale in an environment with ultraviolet light, such as, for example, a compartment, room, closet or pocket. Such components and case is not limited to any particular type of portable scale, and may be incorporated into any known portable scale, such as, for example, a balance beam scale, a spring scale, a load cell scale or a digital scale.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed. Rather, the invention extends to all functionally equivalent structures, methods, and uses such as are within the scope of the appended claims.

What is claimed is:

1. A portable scale comprising:
   a fulcrum;
   a balance beam pivotally mounted on said fulcrum, said balance beam supporting a load pan on one end and comprising an elongated portion having a measurement strip thereon extending from a first end toward a second, opposite end of said elongated portion of said balance beam, wherein said fulcrum is positioned between said load pan and said first end of said elongated portion; and
   a dynamic weight movable along said balance beam from said first end to said second end of said elongated portion of said balance beam, said dynamic weight including a display unit on said elongated portion of said balance beam for detecting said location of said dynamic weight along said measurement strip, for electrically converting the location to a weight measurement, and for displaying said weight measurement.

2. The portable scale according to claim 1, further comprising a thumb wheel mounted on said balance beam, a stop mounted on said second end of said elongated portion of said balance beam, an elongated spindle having two ends, one of said two ends of said spindle being mounted in said thumb wheel for turning therewith, and the other of said ends being mounted at said stop, and a nut mounted on said dynamic weight for engagement with said spindle, wherein said dynamic weight can be moved along said elongated portion of said balance beam by turning said thumb wheel and said spindle therewith, which in turn moves said nut and said dynamic weight along said balance beam.

3. The portable scale according to claim 2, wherein said nut comprises a half nut and said dynamic weight further includes a pivot having a pivot axis perpendicular to the axis of said elongated spindle such that said dynamic weight can be pivoted about said pivot axis to lift said half nut off said spindle, to make coarse weight adjustments.

4. The portable scale according to claim 2, wherein said dynamic weight further comprises a pair of slider bases for engagement with the sides of said balance beam and a bracket for holding said nut, such that said pair of slider bases slides along the edges of said balance beam as said nut and said dynamic weight move along said balance beam.

5. The portable scale according to claim 1, wherein said dynamic weight is removable and replaceable, enabling variations in a measurement range of the portable scale.

6. The portable scale according to claim 1, wherein said dynamic weight further comprises a push button for resetting the weight measurement to zero.

7. The portable scale according to claim 1, wherein said dynamic weight further comprises a push button for switching between different systems of measurement.

8. The portable scale according to claim 1, further comprising a carrying case for holding said portable scale, wherein said carrying case includes luminescent material.

9. The portable scale according to claim 8, wherein said luminescent material comprises plastic having luminescent pigment therein.

10. The portable scale according to claim 8, wherein said luminescent material comprises plastic having phosphorescent material therein.

11. The portable scale according to claim 8, wherein said luminescent material comprises material which glows under ultraviolet light.

12. The portable scale according to claim 1, wherein said portable scale includes luminescent material.

13. The portable scale according to claim 12, wherein said luminescent material comprises plastic having luminescent pigment therein.

14. The portable scale according to claim 12, wherein said luminescent material comprises plastic having phosphorescent material therein.

15. The portable scale according to claim 12, wherein said luminescent material comprises material which glows under ultraviolet light.

16. A portable scale comprising:

a base;

a pair of fulcrum posts projecting from said base;

a balance beam pivotally supportable on said pair of fulcrum posts, said balance beam comprising a load pan support member on one end and an elongated portion having a measurement strip thereon extending from said first end toward a second, opposite end of said elongated portion, said pair of fulcrum posts positioned between said load pan support member and said first end of said elongated portion of said balance beam;

a load pan pivotally supported by said load pan support member;

a dynamic weight member movably mounted on said balance beam for movement along said elongated portion, said dynamic weight including a display unit on said elongated portion of said balance beam for detecting said location of said dynamic weight member along said measurement strip, for electrically converting the location to a weight measurement, and for displaying said weight measurement; and a stationary counter weight attached to said load pan support member;

wherein said stationary counter weight balances against said dynamic weight member when said dynamic weight is located at a zero position of said measurement strip on said balance beam.

17. The portable scale according to claim 16, further comprising a carrying case, said carrying case comprising a top portion and a bottom portion, said top portion being closable onto said bottom portion and wherein said bottom portion comprises said base of said portable scale.

18. The portable scale according to claim 16, further comprising a thumb wheel mounted on said balance beam, a stop mounted on said second end of said elongated portion of said balance beam, an elongated spindle having two ends, one of said two ends of said spindle being mounted in said thumb wheel for turning therewith, and the other of said ends being mounted at said stop, and a nut mounted on said dynamic weight member for engagement with said spindle, wherein said dynamic weight member can be moved along said elongated portion of said balance beam by turning said thumb wheel and said spindle therewith, which in turn moves said nut and said dynamic weight along said balance beam.

19. The portable scale according to claim 18, wherein said nut comprises a half nut and said dynamic weight member further includes a pivot having a pivot axis perpendicular to the axis of said elongated spindle such that said dynamic weight member can be pivoted about said pivot axis to lift said half nut off said spindle, to make coarse weight adjustments.

20. The portable scale according to claim 16, wherein said dynamic weight member further comprises a pair of slider bases for engagement with the sides of said balance beam and a bracket for holding said nut, such that said pair of slider bases slides along the edges of said balance beam as said nut and said dynamic weight move along said balance beam.

21. The portable scale according to claim 16, wherein said dynamic weight member is removable and replaceable, enabling variations in a measurement range of the portable scale.

22. The portable scale according to claim 16, wherein said dynamic weight member further comprises a push button for resetting the weight measurement to zero.

23. The portable scale according to claim 16, wherein said dynamic weight member further comprises a push button for switching between different systems of measurement.

24. The portable scale according to claim 1, wherein said measurement strip comprises a printed circuit board having a pattern thereon for indicating said location of said dynamic weight member along said balance beam.

25. The portable scale according to claim 1, wherein said measurement strip comprises an inlayed strip of copper or glass and a pattern etched into said inlayed strip for indicating said location of said dynamic weight member along said balance beam.

26. The portable scale according to claim 16, wherein said measurement strip comprises a printed circuit board having a pattern thereon for indicating said location of said dynamic weight member along said balance beam.

27. The portable scale according to claim 16, wherein said measurement strip comprises an inlayed strip of copper or glass and a pattern etched into said inlayed strip for indicating said location of said dynamic weight member along said balance beam.

28. The portable scale according to claim 16, further comprising a carrying case for holding said portable scale, wherein said carrying case includes luminescent material.

29. The portable scale according to claim 28, wherein said luminescent material comprises plastic having luminescent pigment therein.

30. The portable scale according to claim 28, wherein said luminescent material comprises plastic having phosphorescent material therein.

31. The portable scale according to claim 28, wherein said luminescent material comprises material which glows under ultraviolet light.

32. The portable scale according to claim 16, wherein said portable scale includes luminescent material.

33. The portable scale according to claim 32, wherein said luminescent material comprises plastic having luminescent pigment therein.

34. The portable scale according to claim 32, wherein said luminescent material comprises plastic having phosphorescent material therein.

35. The portable scale according to claim 32, wherein said luminescent material comprises material which glows under ultraviolet light.

* * * * *